Figure 3:
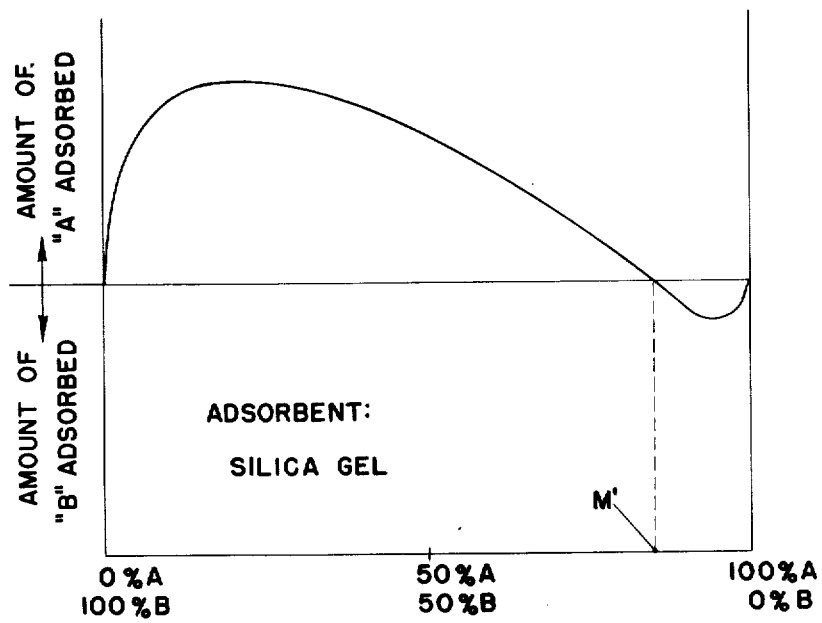

Aug. 31, 1948.  A. E. HIRSCHLER  2,448,489
SEPARATION OF AROMATIC HYDROCARBONS BY
SELECTIVE ADSORPTION IN SILICA GEL
Filed April 14, 1943
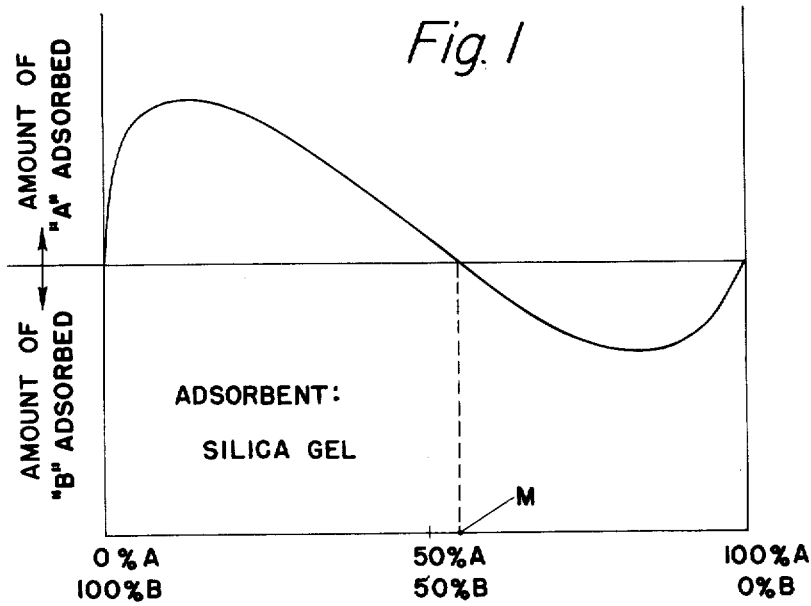
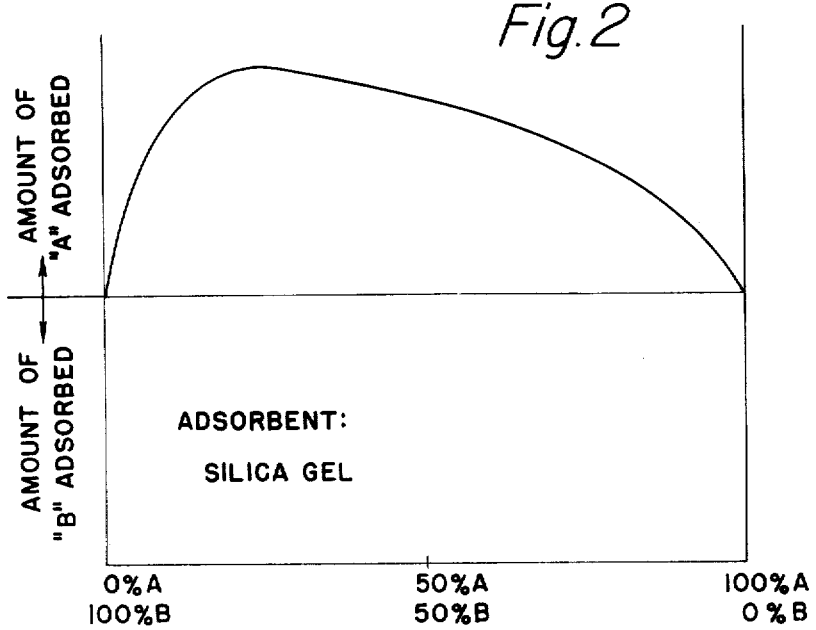
INVENTOR.
ALFRED E. HIRSCHLER
BY
Busser and Harding
ATTORNEYS Patented Aug. 31, 1948

2,448,489

UNITED STATES PATENT OFFICE 2,448,489

SEPARATION OF AROMATIC HYDROCARBONS BY SELECTIVE ADSORPTION IN SILICA GEL

Alfred E. Hirschler, Drexel Hill, Pa., assignor to Sun Oil Company, Philadelphia, Pa., a corporation of New Jersey Application April 14, 1948, Serial No. 20,883

8 Claims. (Cl. 260—674)

This invention relates to the separation of hydrocarbons of the aromatic type. The invention is particularly directed to a method of preparing an aromatic hydrocarbon of high purity from a mixture containing it together with one or more other aromatic hydrocarbons having the same number of double bonds per molecule as the desired hydrocarbon by means of selective adsorption.

It is well known that aromatic hydrocarbons may be separated from non-aromatic hydrocarbons by selective adsorption on a granular adsorbent of high activity such as silica gel. It is also known that among the aromatic hydrocarbons separation may be effected to an extent by this method between hydrocarbons having different numbers of aromatic rings per molecule. For example, it is recognized that bicyclic aromatics generally are more strongly adsorbed by an adsorbent such as silica gel than monocyclic aromatics and that tricyclic aromatics are still more strongly adsorbable. However, little if any practical utility has been made of such known differences in adsorbabilities, since the separation of aromatics according to the number of rings per molecule usually may readily be accomplished by means of distillation.

On the other hand, it has been presumed heretofore that aromatics which have the same number of double bonds per molecule, as where the number and type of rings (i. e., condensed or uncondensed) are the same, will not exhibit sufficient differences in adsorbabilities to make possible a separation by the adsorption method. Particularly has this been considered to be the case where the aromatic hydrocarbons are isomers or adjacent homologues. It is in just such cases, however, that a suitable means of separating the hydrocarbons is most desirable, since it is in such cases that distillation is ineffective to make a good separation between the hydrocarbons due to the proximity of their boiling points.

I have now found that all aromatic hydrocarbons, even though they have the same number of double bonds per molecule, nevertheless have sufficiently different adsorbabilities to be separable by selective adsorption on silica gel. The present invention thus provides a process for separating any two aromatic hydrocarbons which have the same number of double bonds per molecule. Briefly, the process comprises subjecting a mixture of such hydrocarbons to treatment in liquid phase with silica gel to selectively adsorb one of the aromatic hydrocarbons from the charge and separating from the silica gel one or more fractions in which the proportion of the other hydrocarbon to the selectively adsorbable hydrocarbon is higher than in the starting mixture or in other words containing the other aromatic in a more nearly pure state. Where the aromatic which is selectively adsorbed is the hydrocarbon that is desired in purified form, it may be obtained by displacing the adsorbate from the silica gel by means of a suitable desorbing agent.

I have further found that mixtures of aromatics which have the same number of double bonds per molecule exhibit adsorption behaviors which may be classified in two general types. One type occurs where one of the aromatic components is selectively adsorbed from the mixture throughout a portion of the concentration range while the other aromatic is the component which is selectively adsorbed throughout the remainder of the concentration range. I have discovered that a great number of aromatic pairs behave in this manner. The other type occurs where one of the aromatics is the selectively adsorbable component throughout the whole concentration range. Other aromatic mixtures exhibit this type of behavior. All aromatics having the same number of double bonds per molecule conform to one or the other type of behavior. It is not always possible to predict in advance which type of behavior will be exhibited by any given pair of the hydrocarbons; so that in any such case if it is desired to know with certainty in advance just which type of behavior will be encountered, it is necessary to predetermine the effect of proportions of the components on the relative adsorbabilities. This is not necessary in order to insure operability of the process, however, since a separation will always be effected in accordance with the invention regardless of the particular adsorption behavior of the charge components, as more fully discussed hereinafter.

The accompanying drawings are schematic illustrations of the types of behavior of hydrocarbon pairs as discussed above. The drawings depict the types of adsorption isotherms obtained for mixtures of aromatic hydrocarbon pairs throughout the complete composition range of 0 to 100% for each component. As is well known, the adsorption isotherms show the relationship between composition of the mixture at equilibrium with a given amount of adsorbent and the amount of component adsorbed. (The latter value is the "apparent" amount as customarily calculated from the change in composition of the mixture before and after adsorption assuming no adsorption of the other component.)

Figure 1 is representative of the type of adsorption isotherm obtained where one of the components is selectively adsorbed over part of the concentration range and the other component is selectively adsorbed over the remainder of the range. Figure 2 illustrates the adsorption isotherm where one of the components is selectively adsorbable throughout the whole concentration range. Figure 3 represents the same type of behavior as shown in Figure 1, except that one of the components is selectively adsorbed over a much wider portion of the concentration range than is the other component. Most aromatic hydrocarbons having the same number of double bonds per molecule form a system of the type illustrated by Figures 1 and 3, or in other words exhibit a so-called S-type adsorption-isotherm, as distinguished from a U-type isotherm such as shown in Figure 2.

With the type of behavior as shown in Figure 1, component A is selectively adsorbable from any mixture of the hydrocarbons, A and B, which has a composition lying between 0% A and that represented by point M which is the composition corresponding to the point where the adsorption isotherm crosses the horizontal line. On the other hand, component B is selectively adsorbable from any mixture where the proportion of A is above that represented by point M. Either component may therefore be prepared in a highly purified state, depending upon which side of point M the starting mixture composition falls. For example, by starting with a technical grade of the A component, say a mixture which contains A in a concentration of 80% or more, the mixture may be treated with silica gel to selectively adsorb B and thereby obtain A in highly purified form. Likewise, by starting with a technical grade of the B component, B may be obtained in highly purified form. I have found that with mixtures of this type the smaller amount of the hydrocarbon present as impurity, the more easily its removal may be accomplished according to the present process. This is in contrast to other separation methods such as distillation or solvent extraction wherein the separation becomes more difficult as the amount of the impurity decreases. Examples of hydrocarbon mixtures which exhibit the type of behavior shown in Figure 1 are o-xylene-ethylbenzene and p-xylene-ethylbenzene.

Where the behavior is of the type shown in Figure 2, the A component is selectively adsorbed from the mixture regardless of its concentration. When a mixture of this type is treated with silica gel, the A component will always be selectively removed, thus yielding the B component in a more nearly pure form. Also, by desorbing the A component from the used adsorbent in a suitable manner, A likewise may be obtained in purified form.

Figure 3 illustrates a system of the same type as illustrated in Figure 1 but wherein the A component is selectively adsorbable over a great part of the concentration range, for example, when its concentration lies between 0% and 85%. With mixtures of this type, the B component is not as readily removable when it is present in small amount as is A when it is present in low concentration. Nevertheless, B may be selectively removed when the starting mixture contains A in any proportion above that represented by point M', and the lower the concentration of B the more effective is its removal. If the concentration of B in the starting mixture is low to begin with (say 2 or 3% or the like), further effective purification of A may readily be accomplished. As previously stated, this is in contrast to other methods where further purification becomes extremely difficult when a low concentration of one of the components is reached. By way of example, a mixture of benzene and toluene forms the type of system illustrated by Figure 3, with the toluene corresponding to the B component in being the more strongly adsorbable only at concentrations below about 15%.

It should be noted that with hydrocarbons which form the S-type adsorption isotherm (Figures 1 and 3), there is a theoretical point (M or M') at which the hydrocarbons will have the same adsorbability and therefore would not, theoretically, be separable by selective adsorption. In actual practice, however, there is no condition at which separation is absolutely incapable of being effected. There are several reasons why at least some separation will occur even with a starting mixture which approximates, as closely as possible, the composition corresponding to the aforesaid theoretical point. One is that a mixture corresponding absolutely to such point could never be encountered, due to the fact that it is a point, as distinguished from a zone, and therefore is dimensionless and can only be approximated but never exactly reached. Thus, some separation will always result, although the degree of separation might not be commercially practicable where the starting mixture composition approaches too closely to that corresponding to the theoretical point. Another reason depends upon the fact that, as I have discovered, this theoretical point changes to a substantial extent as the temperature of operation changes. In actual practice, it would never be the case that exactly the same temperature would obtain throughout the whole mass of silica gel being used to treat the starting mixture. There would always be some differences in temperature throughout the adsorbent so that some separation would necessarily result regardless of the starting mixture composition. Still another reason why a separation would always be effected to some extent is due to the fact, as I have further discovered, that the individual particles of adsorbent within any given batch of silica gel vary somewhat in adsorptive qualities. For example, it has been found that the theoretical point will be different depending upon the size of the particles segregated from a given batch of the adsorbent. Even if it were possible that the starting mixture corresponded exactly to the theoretical point for some of the particles, it would not so correspond for other particles constituting the adsorbent mass.

It is therefore apparent that regardless of what the particular proportion of aromatics in the starting mixture may be, a separation, at least to some extent, will always be effected in practicing the present process. It is impracticable to define the narrow zone on opposite sides of the theoretical point within which the process might not have a degree of utility warranting its practice on a commercial scale. The limits of such narrow zone would not be critical and would vary with starting mixtures of different aromatics and their relative proportion, and more particularly with the degree of purification desired; but as explained above the present process would always be operative to effect some worth-while degree of separation. Where the starting mixture is of the S-type and its composition is sufficiently close to the above discussed theoretical point so that treatment of the mixture does not give a commercially worth-while improvement, the degree of separation may be improved by operating at a different temperature or by first changing the composition of the starting mixture in some other manner, for example, by distillation or by adding to the mixture more of one of the constituents, after which treatment may be carried out according to the present process to effect a high degree of purification.

The type of starting mixture to which the present process usually will be applied in actual practice is one which contains the desired aromatic in more or less concentrated form initially and which contains as impurity not merely one other aromatic but a plurality of aromatics in minor amounts. For example, the charge may be an aromatic fraction containing the desired aromatic in a concentration exceeding 80%, say 90% or 95% or the like, together with several other aromatics as impurity. As a general rule, these aromatics will boil sufficiently close to the boiling point of the desired aromatic that purification by distillation will be exceedingly difficult or substantially impossible as a practical matter. With such mixtures purification will always be effected by the present process, aside and apart from the several reasons above discussed as to why a separation will always be obtained. This is due to the fact that where there are several aromatic impurities in the charge, the adsorption isotherm for each one with the desired aromatic will be different; so that even if the proportion of one is such that its adsorbability will not be sufficiently different from that of the desired hydrocarbon that a practicable degree of separation between the two can be effected, this will not be true as to the other aromatics present as impurity. A separation between these other aromatics and the desired aromatic will be obtained, thus yielding the desired hydrocarbon in a substantially purified form.

A preferred method of conducting the process comprises carrying out the treatment by percolating the starting mixture of hydrocarbons through a column of the adsorbent. Preferably a large proportion of adsorbent is used relative to the amount of hydrocarbon material to be treated. After all of the charge has passed into the adsorbent, it may be followed by a desorbing agent, such as a polar organic liquid (for example, alcohol or acetone) or water, to displace the adsorbate. Desorption may also be accomplished, if desired, by using a non-polar liquid such as an aromatic which contains a greater number of rings per molecule than the aromatics being treated. Desorption may also be effected by employing a saturated hydrocarbon in sufficiently large amount to displace the adsorbate and thereby reactivate the adsorbent for re-use in the process. The use of a desorbing agent is necessary where the desired component is the one which is selectively adsorbed. In the other case where the desired component is not preferentially adsorbed and therefore appears in highest purity as the first portion of efflux or filtrate from the column, a desorbing agent is not necessarily required provided sufficient charge is used to wet all of the adsorbent and produce a filtrate. In either case the efflux from the column is collected in separate fractions as desired in order to segregate the portion which has the desired purity.

With hydrocarbons that behave as illustrated in Figure 1, the first portion of efflux or filtrate will comprise the less strongly adsorbable component in a relatively high state of purity as compared to the charge. Succeeding portions will decrease in purity and, as the adsorbate is displaced from the gel, the filtrate will become less pure than the charge. However, with this type of system the component which is preferentially adsorbed will never be obtained in high concentration but only in concentrations below that represented by point M.

With the type of system as illustrated by Figure 2, the first portion of filtrate will be relatively rich, as compared to the charge, in the less adsorbable component regardless of the charge composition. Succeeding portions will become less and less rich in this component, eventually becoming enriched with respect to the more adsorbable component as it is displaced from the gel by means of the desorbing agent. Thus it is possible to obtain one component in concentrated form as the first portion of filtrate and also to obtain the other component in enriched form as the last portion of filtrate. The degree of separation will depend to some extent upon the amount of adsorbent used.

When the system is the type shown in Figure 3, the first portion of filtrate will be rich with respect to the less adsorbable component and the succeeding portions will vary in composition generally as described for systems as in Figure 1. Although it will be possible to obtain the more adsorbable component in enriched form as the last portions of filtrate, this constituent will never appear in a very high state of purity but only in concentrations which are less than that represented by point M'.

The following examples, in which percentages are given on a molar basis unless otherwise stated, illustrate the invention more specifically.

*Example I*

A mixture comprising 90% toluene and 10% benzene by volume was treated to remove the benzene and thereby purify the toluene. This was done by percolating the mixture down through a 1.3 inch I. D. column filled to a height of about 4 feet with 780 grams of 28–200 mesh activated silica gel. The column was provided with a water jacket through which water was continuously circulated at a temperature of about 45–50° F. to absorb the heat generated due to wetting of the gel. A total of 145 ml. of the charge material was passed into the gel, and this was followed by alcohol in amount sufficient to displace the hydrocarbons from the gel bed. The first part of the filtrate was collected in four cuts and each cut was tested for purity by the freezing point method. Results obtained for these cuts and for the last cut displaced from the gel were as follows:

| Cut No. | Fraction of Charge (by vol.) | Concentration of Toluene in Cut, vol. per cent |
|---|---|---|
| | *Percent* | |
| 1 | 0 – 4.8 | 95.2 |
| 2 | 4.8–12.4 | 93.6 |
| 3 | 12.4–24.8 | 92.9 |
| 4 | 24.8–38.6 | 92.2 |
| Last Cut | 92.4–96.6 | 84.8 |

It may be seen that the benzene was selectively removed from the toluene, so that the first portions of filtrate were substantially purer with respect to toluene than the charge. Further purification could have been effected by retreating the cuts.

*Example II*

This example illustrates the separation of o-xylene from ethylbenzene. 95 ml. of a mixture of these constituents containing 97.4% ethylbenzene were treated with 770 grams of silica gel in the manner described in Example I. A first cut of 6 ml. representing about 6.3% by volume of the charge was substantially 100% pure ethylbenzene; a second cut amounting to about 21% by volume of the charge had a purity of 99.0%; and a third cut amounting to about 10.5% by volume of the charge had a purity of 98.4%.

Example III

This example illustrates the separation of ethylbenzene from o-xylene. 50 ml. of the starting mixture, which contained 96.9% o-xylene together with ethylbenzene, were treated with 180 grams of 28–200 mesh silica gel in a column having a height of about 3.5 feet, the method of operating being substantially as described in Example I. A first cut of 9.6% by volume of the charge was 99.0% pure o-xylene; a second cut amounting to 11.0% by volume of the charge had a purity of 98.3%; and a third cut representing 9.2% had a purity of 97.8%.

Example IV

In another run in which 95 ml. of a mixture containing 96.5% ethylbenzene together with p-xylene were treated with 770 grams of silica gel in the manner described in Example I, the first cut (13.7% by volume of the charge) had a purity of 98.4% and the second cut (28.4% by volume of the charge) had a purity of 98.2%.

Example V

In another run carried out as in the previous example but in which the starting material was a mixture containing 95.7% p-xylene together with ethylbenzene, the first 15% cut of the filtrate contained 96.8% p-xylene.

Example VI

This example illustrates the separation of m-xylene from ethylbenzene. 77 ml. of a mixture of ethylbenzene and m-xylene containing 96.0% ethylbenzene were percolated through 770 grams of silica gel and then desorbed therefrom as in the manner previously described. A first cut of 21% by volume of the charge contained 98.2% ethylbenzene while a second cut of about 22% by volume had an ethylbenzene content of 97.6%.

Example VII

The charge stock in the present run was a mixture of the two isomers, m-xylene and o-xylene. 100 ml. of a mixture of these constituents containing 96.4% o-xylene were treated with 770 grams of silica gel as described in Example I. The first three cuts of the filtrate, which amounted respectively to 7.0%, 12.0% and 13.0% by volume of the charge, contained o-xylene in concentrations of 98.7%, 98.0% and 97.7% respectively.

Example VIII

This example is directed to the separation of two isomers, namely p-xylene and m-xylene, which are very difficult to separate by distillation due to the fact that their boiling points differ by only about 0.7° C. 90 ml. of a mixture of these isomers containing 96.2% m-xylene were percolated through a 1 inch I. D. column packed to a height of approximately 9 feet with 800 grams of 28–200 mesh silica gel. The charge material was then desorbed as in previous examples. The first cut amounting to 12.2% by volume of the charge contained 97.9% m-xylene while the second cut amounting to 16.7% by volume of the charge contained 97.3% m-xylene. To accomplish by distillation the same degree of purification as shown in this example would require fractionating equipment having a very large number of theoretical plates and the use of a very high reflux ratio.

Example IX

This example illustrates the purification of cumene, starting with a commercially available mixture in which the concentration of cumene was 95.4%. The mixture contained 3.7% of other close boiling aromatic material which was not specifically identified, as well as 0.9% of saturated hydrocarbon material. A column of 1 inch I. D. packed with 770 grams of 28–200 mesh silica gel to a height of about 8.5 feet was used. 200 ml. of the starting material were percolated through the gel and were followed by alcohol as in previous examples. The first cut of filtrate which amounted to 7.5% by volume of the charge contained most of the saturated material and was of relatively low purity. The next fraction representing 10.0% by volume of the charge had a purity of 98.8% and a third fraction also amounting to 10.0% had a purity of 98.6%. This example shows that the invention may be utilized to purify an aromatic hydrocarbon which contains minor amounts of other aromatic material of close boiling point together with non-aromatic impurity.

Example X

The present example illustrates a method of practicing the invention involving retreating the filtrate fractions in the order in which they are taken, whereby greater efficiency in purification is obtained. The starting material in this case was a mixture of 98.5% m-xylene and 1.5% of other C8 aromatic material which was not specifically identified. 200 ml. were percolated through 770 grams of 28–200 mesh silica gel in a 1.3 inch I. D. column packed to a height of about 4 feet. The charge was displaced from the column by means of alcohol. The first cut was 3.5% of the charge and had a purity of 99.2%. A total of about 102 ml. of filtrate was withdrawn before the m-xylene content dropped down to that of the charge. The filtrate was collected in five fractions having volumes of 17, 25, 20, 20 and 20 ml. These fractions were retreated in a 1.3 inch I. D. column containing about 9 feet of fresh silica gel (1650 grams). The cuts were added to the column in the order in which they had been taken in the previous treatment, each cut being allowed to pass completely into the gel before the next cut was added. The fifth cut was then followed by an additional 300 ml. of the untreated charge. The first 22 ml. of filtrate (4.4% by volume of the total charge used) was 99.5% pure m-xylene while the first 130 ml. (26.0% by volume of the total charge) had an average purity of 99.2%.

Example XI

This example illustrates how the retreating procedure may be employed where the charge material contains, in addition to the aromatic impurity, a small amount of saturate hydrocarbon material. The charge was 96.5% pure mesitylene containing as the impurity mainly other close boiling aromatic material not specifically identified and also a small amount of saturate hydrocarbons. 400 ml. of this charge material were treated with 1650 grams of silica gel in a 1.3 inch by 9 feet column in the manner previously described and the filtrate was collected in 25 ml. fractions. The first five fractions were retreated with 285 grams of fresh gel in a smaller column by percolating them through the gel in the order in which they had been obtained. In this manner the saturate material was concentrated mainly in the first 40 ml. fraction of filtrate from this second treatment, and this fraction was discarded. The rest of the filtrate amounting to about 75 ml. and the other 25 ml. cuts (Nos. 6–13) obtained from the first treatment were still further treated with 1650 grams of fresh gel. This was done by adding the cuts to the gel in the order of decreasing purity and permitting each cut to pass completely into the gel before the next cut was added. The filtrate from this retreatment was separated into fractions which were tested for purity. The results were as follows:

| Cut No. | Volume, ml. | Volume percent of charge | Purity, percent |
|---|---|---|---|
| 1 | 25 | 6.2 | 99.0 |
| 2 | 125 | 31.3 | 99.5 |
| 3 | 75 | 18.7 | 99.4 |

It may be seen that this procedure resulted in a mesitylene product of very high purity. Cut. No. 1 had a lower purity than the succeeding cuts due to the presence of a small amount of the saturate material.

*Example XII*

In this example a sample of p-diisopropylbenzene which had been prepared synthetically and subjected to treatment by other methods to effect purification was then treated according to the invention to obtain further purification. The starting material contained 95.8% p-diisopropylbenzene, the remainder being essentially isomeric aromatic hydrocarbons which were not specifically identified. A column 1 inch in diameter and 8 feet in height was packed with 850 grams of 28–200 mesh silica gel. 200 ml. of the charge material was percolated through the column at a temperature of about 15–20° C. Alcohol was then added to the column to displace the hydrocarbons. The first 25 ml. portion of filtrate was found to be 99.12% pure p-diisopropylbenzene.

*Example XIII*

This example was conducted to effect purification of a commercial p-cymene product. The starting material contained 97.7% p-cymene together with other close boiling aromatic hydrocarbons not specifically identified and a small amount of saturate hydrocarbon material. 204 ml. of the starting material were filtered through a column 1 inch by 8 feet containing 800 grams of 28–200 mesh silica gel at a temperature of about 15–20° C. Alcohol was then used as the desorbing agent. The filtrate was collected in several cuts, with results as follows:

| Cut No. | Fraction of Charge (by volume) | Concentration of p-cymene in cut |
|---|---|---|
|  | Per cent | Per cent |
| 1 | 0–31.8 |  |
| 2 | 31.8–41.6 | 99.35 |
| 3 | 41.6–61.8 |  |
| 4 | 61.8–69.0 | 99.89 |

*Example XIV*

This example illustrates the purification of secondary butylbenzene containing other close boiling aromatic material not specifically identified and also a small amount of saturate hydrocarbon material. The charge contained 98.69% secondary butylbenzene. A column of 1 inch I. D. and 8 feet height containing 800 grams of 28–200 mesh silica gel was used, the temperature of operation being about 15–20° C. 200 ml. of the charge were passed through the column followed by alcohol as a desorbing agent. The first 20 ml. of filtrate which contained most of the saturate material was discarded and the next 166 ml. was collected as a separate fraction. This fraction was then retreated in the same column employing 800 grams of fresh silica gel. Several cuts were collected from the second cycle and anaylzed with results as follows:

| Cut No. | Volume fraction of filtrate | Purity |
|---|---|---|
|  | Ml. |  |
| 1 | 0–24 |  |
| 2 | 24–36 | 99.23 |
| 3 | 35–50 | 99.47 |
| 4 | 50–72 |  |
| 5 | 72–83 | 99.3 |

In practicing the invention it generally will be desirable to reactivate the adsorbent after it has been used in order that it may be used again. This may be done by blowing the adsorbent with hot inert gas or air to drive off the adsorbed hydrocarbons or to drive off the desorbing agent if one has been used. Also the adsorbent may be reactivated by desorbing the aromatics by means of a saturated hydrocarbon liquid. The boiling point of the saturated hydrocarbon preferably should be sufficiently different from that of the aromatic material so that the two may be readily separated by distillation after the desorption has been completed. The reactivated adsorbent may then be re-used for further treatment of the aromatic charge and the recovered saturated hydrocarbon may be re-used in a subsequent reactivation step.

The temperature at which the adsorption operation is carried out may affect the efficiency of the separation and it generally will be the case that the adsorbent will have a poorer adsorption capacity at elevated temperature. The operation therefore is preferably conducted at room temperature or below to insure a better separation. This generally will necessitate the provision of some means for removing any heat generated due to wetting of the adsorbent as, for instance, by providing means for circulating a cooling medium around the adsorbent column or through cooling coils located within the adsorbent bed.

It is contemplated that adsorbents other than silica gel may be used in practicing the process provided that they conform substantially to silica gel in adsorptive properties and similarly have a high activity. Other modifications of the process are permissible within the broad aspects of the invention and will be apparent to those skilled in the art.

This application is a continuation-in-part of my co-pending application Serial No. 660,076, filed April 6, 1946.

Having described my invention, what I claim and desire to protect by Letters Patent is:

1. A process for separating two aromatic hydrocarbons having the same number of double bonds per molecule which comprises passing a liquid hydrocarbon mixture composed at least mainly of such aromatic components through a body of silica gel, thereby selectively adsorbing one of said aromatic hydrocarbons, and separating from the silica gel a filtrate fraction which contains only a portion of the total aromatics in the starting mixture, thereby obtaining a product in which the proportion of one of said hydrocarbons to the other of said hydrocarbons is higher than in the starting mixture.

2. Method according to claim 1 in which there is also separated from the silica gel another fraction in which the said proportion is lower than in the starting mixture.

3. A process according to claim 1 in which the two aromatic hydrocarbons are isomers.

4. A process according to claim 1 in which the two aromatic hydrocarbons are adjacent homologues.

5. A process for purifying an aromatic hydrocarbon which contains in admixture therewith a small amount of another aromatic hydrocarbon having the same number of double bonds per molecule as the first mentioned aromatic hydrocarbon, the mixture being purified substantially free of non-aromatic hydrocarbons which comprises filtering the mixture through a body of silica gel, thereby selectively adsorbing said other hydrocarbon which is present in small amount, and separating from the silica gel a filtrate fraction containing the desired aromatic hydrocarbon in relatively pure state.

6. A process according to claim 5 in which the two aromatic hydrocarbons are isomers.

7. A process according to claim 5 in which the two aromatic hydrocarbons are adjacent homologues.

8. The process according to claim 1 wherein said liquid hydrocarbon mixture is composed essentiallly of aromatic components.

ALFRED E. HIRSCHLER.

REFERENCES CITED

The following references are of record in the file of this patent:

Mair et al., "Separation of Petroleum Hydrocarbons With Silica Gel," U. S. Bureau of Standards Journal of Research, vol. 15, No. 1 (July, 1935). Research Paper No. R. P. 809. Pages 51-16 (12 pages). (Pages 59, 60, and 61, are especially pertinent.)

Certificate of Correction

Patent No. 2,448,489.   August 31, 1948.

ALFRED E. HIRSCHLER

It is hereby certified that error appears in the printed specification of the above numbered patent requiring correction as follows:

Column 11, line 28, claim 5, after the word "purified" insert *being*;

and that the said Letters Patent should be read with this correction therein that the same may conform to the record of the case in the Patent Office.

Signed and sealed this 12th day of April, A. D. 1949.

[SEAL]

THOMAS F. MURPHY,
*Assistant Commissioner of Patents.*

1. A process for separating two aromatic hydrocarbons having the same number of double bonds per molecule which comprises passing a liquid hydrocarbon mixture composed at least mainly of such aromatic components through a body of silica gel, thereby selectively adsorbing one of said aromatic hydrocarbons, and separating from the silica gel a filtrate fraction which contains only a portion of the total aromatics in the starting mixture, thereby obtaining a product in which the proportion of one of said hydrocarbons to the other of said hydrocarbons is higher than in the starting mixture.

2. Method according to claim 1 in which there is also separated from the silica gel another fraction in which the said proportion is lower than in the starting mixture.

3. A process according to claim 1 in which the two aromatic hydrocarbons are isomers.

4. A process according to claim 1 in which the two aromatic hydrocarbons are adjacent homologues.

5. A process for purifying an aromatic hydrocarbon which contains in admixture therewith a small amount of another aromatic hydrocarbon having the same number of double bonds per molecule as the first mentioned aromatic hydrocarbon, the mixture being purified substantially free of non-aromatic hydrocarbons which comprises filtering the mixture through a body of silica gel, thereby selectively adsorbing said other hydrocarbon which is present in small amount, and separating from the silica gel a filtrate fraction containing the desired aromatic hydrocarbon in relatively pure state.

6. A process according to claim 5 in which the two aromatic hydrocarbons are isomers.

7. A process according to claim 5 in which the two aromatic hydrocarbons are adjacent homologues.

8. The process according to claim 1 wherein said liquid hydrocarbon mixture is composed essentially of aromatic components.

ALFRED E. HIRSCHLER.

REFERENCES CITED

The following references are of record in the file of this patent:

Mair et al., "Separation of Petroleum Hydrocarbons With Silica Gel," U. S. Bureau of Standards Journal of Research, vol. 15, No. 1 (July, 1935). Research Paper No. R. P. 809. Pages 51–16 (12 pages). (Pages 59, 60, and 61, are especially pertinent.)

Certificate of Correction

Patent No. 2,448,489.   August 31, 1948.

ALFRED E. HIRSCHLER

It is hereby certified that error appears in the printed specification of the above numbered patent requiring correction as follows:

Column 11, line 28, claim 5, after the word "purified" insert *being*;

and that the said Letters Patent should be read with this correction therein that the same may conform to the record of the case in the Patent Office.

Signed and sealed this 12th day of April, A. D. 1949.

[SEAL]

THOMAS F. MURPHY,
*Assistant Commissioner of Patents.*